United States Patent
Alsindi et al.

(10) Patent No.: US 12,282,084 B2
(45) Date of Patent: Apr. 22, 2025

(54) OBJECT DETECTION-BASED NOTIFICATION

(71) Applicant: Apple Inc., Cupertino, CA (US)

(72) Inventors: Nayef Alsindi, Dublin, CA (US); Joseph Hakim, Soquel, CA (US); Andrew T. Kezys, San Francisco, CA (US); James T. Curran, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 190 days.

(21) Appl. No.: 17/483,743

(22) Filed: Sep. 23, 2021

(65) Prior Publication Data
US 2023/0090211 A1    Mar. 23, 2023

(51) Int. Cl.
| | | |
|---|---|---|
| G01S 13/58 | (2006.01) | |
| G01S 7/41 | (2006.01) | |
| G01S 13/62 | (2006.01) | |
| G01S 13/66 | (2006.01) | |
| G01S 13/88 | (2006.01) | |

(52) U.S. Cl.
CPC ............ *G01S 13/581* (2013.01); *G01S 7/415* (2013.01); *G01S 13/62* (2013.01); *G01S 13/66* (2013.01); *G01S 13/886* (2013.01)

(58) Field of Classification Search
CPC ........ G01S 13/581; G01S 7/415; G01S 13/62; G01S 13/66; G01S 13/886
See application file for complete search history.

(56) References Cited

U.S. PATENT DOCUMENTS

| | | | |
|---|---|---|---|
| 7,864,103 B2 * | 1/2011 | Weber | G01S 13/426 342/149 |
| 9,459,348 B2 | 10/2016 | Jinkins et al. | |
| 9,583,827 B2 | 2/2017 | Hulsmann et al. | |
| 10,404,261 B1 * | 9/2019 | Josefsberg | G01S 13/931 |
| 2013/0113647 A1 * | 5/2013 | Sentelle | G01S 13/04 342/22 |

(Continued)

FOREIGN PATENT DOCUMENTS

CN    112785835 A  *  5/2021  ........... G08G 1/0104

OTHER PUBLICATIONS

Andric, Milenko, et al. "Analysis of radar Doppler signature from human data." Radioengineering 23.1 (2014): 11-19. (Year: 2014).*

*Primary Examiner* — Vladimir Magloire
*Assistant Examiner* — Nazra Nur Waheed
(74) *Attorney, Agent, or Firm* — BAKERHOSTETLER

(57) ABSTRACT

Implementations of the subject technology provide object detection and/or classification for electronic devices. Object detection and/or classification can be performed using a radar sensor of an electronic device. The electronic device may be a portable electronic device. In some examples, object classification using a radar sensor can be based on an identification of user motion using radar signals and/or based on extraction of surface features from the radar signals. In some examples, object classification using a radar sensor can be based on time-varying surface features extracted from the radar signals. Surface features that can be extracted from the radar signals include a radar cross-section (RCS), a micro-doppler signal, a range, and/or one or more angles associated with one or more surfaces of the object.

20 Claims, 12 Drawing Sheets

(56) References Cited

U.S. PATENT DOCUMENTS

| | | | |
|---|---|---|---|
| 2013/0335569 A1* | 12/2013 | Einecke | G01S 13/867 |
| | | | 348/148 |
| 2018/0200138 A1* | 7/2018 | Hendrix | G01C 21/3626 |
| 2020/0079363 A1* | 3/2020 | Frederick | G06V 10/147 |
| 2020/0202117 A1* | 6/2020 | Wu | H04W 4/029 |
| 2020/0326418 A1* | 10/2020 | Keijer | G01S 13/933 |
| 2021/0103026 A1* | 4/2021 | Chi | G01S 7/415 |
| 2021/0149369 A1* | 5/2021 | Subramanian | G06Q 10/0639 |
| 2021/0259557 A1* | 8/2021 | Frank | G01J 3/50 |
| 2021/0342008 A1* | 11/2021 | Sachidanandam | G06F 3/0346 |

* cited by examiner

OBJECT DETECTION-BASED NOTIFICATION

TECHNICAL FIELD

The present description relates generally to object detection and classification by electronic devices, including generating a notification based on the object detection and/or classification.

BACKGROUND

Detection, classification, and tracking of objects in a physical environment is often performed using Light Detection and Ranging (LIDAR) sensors or computer vision techniques applied to captured optical-wavelength images. However, it can be difficult to detect or classify some objects, such as spatially uniform or optically transparent objects, using these sensors.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Implementations of the subject technology described herein provide radar-based object detection, tracking, and/or classification for electronic devices. Based on the detection and/or classification of an object, an electronic device may generate a notification or alert, such as to alert a user of the device that the object is approaching the device and/or a user of the device (e.g., due to motion of the object and/or motion of the user of the device). In one or more implementations, the radar-based object detection, tracking, and/or classification can be based on detection of a motion characteristic of the device itself. For example, a motion characteristic of the device may be the result, in some use cases, of motion of a platform on which the device is moving and/or user motion of a user of the electronic device that is carrying, wearing, and/or otherwise moving with the electronic device. In one or more implementations, the radar-based object detection, tracking, and/or classification can be based on an extraction of surface features of an object from radar signals. As examples, surface features can include a radar cross-section (RCS), a micro-doppler feature, a range, an azimuth, and/or an elevation of the object. In one or more implementations, the radar-based object detection, tracking, and/or classification may be performed using a radar sensor in a portable electronic device.

Figure 1:
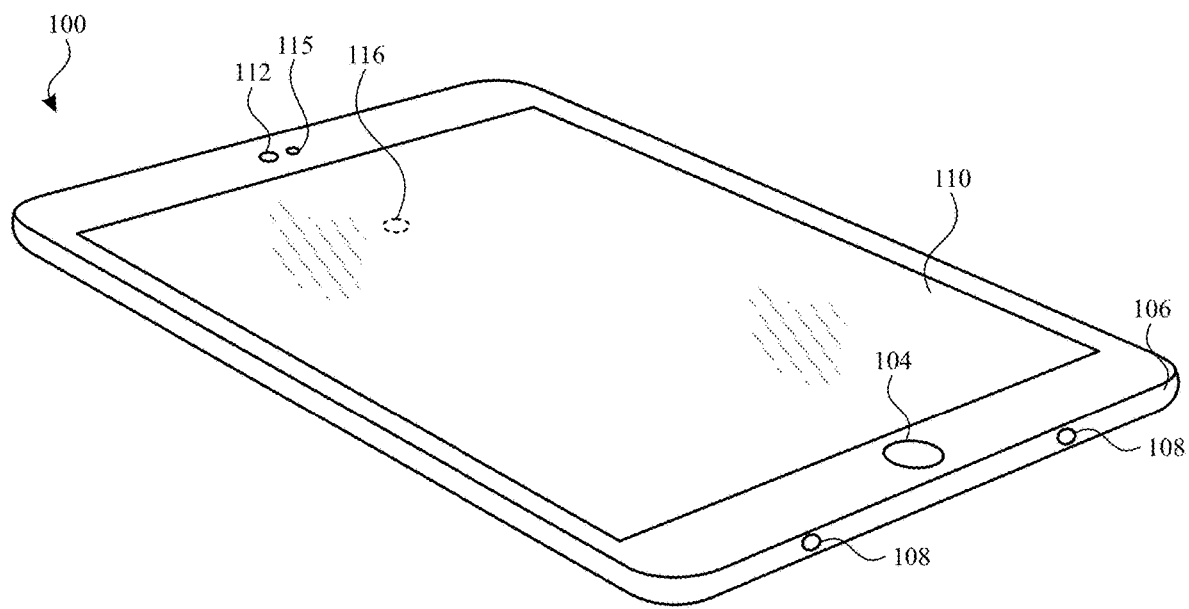
FIGS. 1 and 2 illustrate aspects of an example electronic device in accordance with one or more implementations.

An illustrative electronic device including a radar sensor is shown in FIG. 1. In the example of FIG. 1, electronic device 100 (e.g., a portable electronic device) has been implemented using a housing that is sufficiently small to be portable and carried by a user (e.g., electronic device 100 of FIG. 1 may be a handheld electronic device such as a tablet computer or a cellular telephone or smartphone). As shown in FIG. 1, electronic device 100 includes a display such as display 110, which may be mounted on the front of housing 106. Electronic device 100 includes one or more input/output devices such as a touch screen incorporated into display 110, a button or switch such as button 104 and/or other input output components disposed on or behind display 110 or on or behind other portions of housing 106. Display 110 and/or housing 106 include one or more openings to accommodate button 104, a speaker, a sensor, a light source, and/or a camera.

In the example of FIG. 1, housing 106 includes two openings 108 on a bottom sidewall of housing. One or more of openings 108 forms a port for an audio component. For example, one of openings 108 may form a speaker port for a speaker disposed within housing 106 and another one of openings 108 may form a microphone port for a microphone disposed within housing 106. Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a wearable device such as a smart watch, a pendant device, or other wearable or miniature device, a media player, a gaming device, a navigation device, a computer monitor, a television, a headphone, an earbud, or other electronic equipment. In some implementations, electronic device 100 may be provided in the form of a wearable device such as a smart watch or smart glasses or other headset. In one or more implementations, housing 106 may include one or more interfaces for mechanically coupling housing 106 to a strap or other structure for securing housing 106 to a wearer.

As shown in the example of FIG. 1, the electronic device 100 may include various sensors, such as an image sensor of a camera 112, a radar sensor 116, and/or one or more other sensors such as sensors 115. For example, sensors 115 may be or may include an infrared sensor (e.g., an infrared imaging sensor or a light detection and ranging (LIDAR) sensor), an inertial sensor (e.g., an inertial measurement unit (IMU) sensor, such as an accelerometer, a gyroscope, and/or a magnetometer), an ambient light sensor, or any other sensor for sensing aspects of the physical environment. In the example of FIG. 1, the camera 112 and a sensor 115 are positioned on a front surface of the electronic device 100 (e.g., a surface on which the display 110 is disposed), and the radar sensor 116 is depicted as being positioned on a rear surface of the electronic device. In this configuration the radar sensor 116 can emit radar signals and receive radar reflections of the radar signals in front of the user while the user is viewing the display. However, other configurations are contemplated in which one or more cameras and/or one or more other sensors are positioned on the rear surface, an edge, and/or another location on the electronic device, and/or one or more radar sensors are positioned on the front surface, an edge, or another location on the electronic device.

Figure 2:
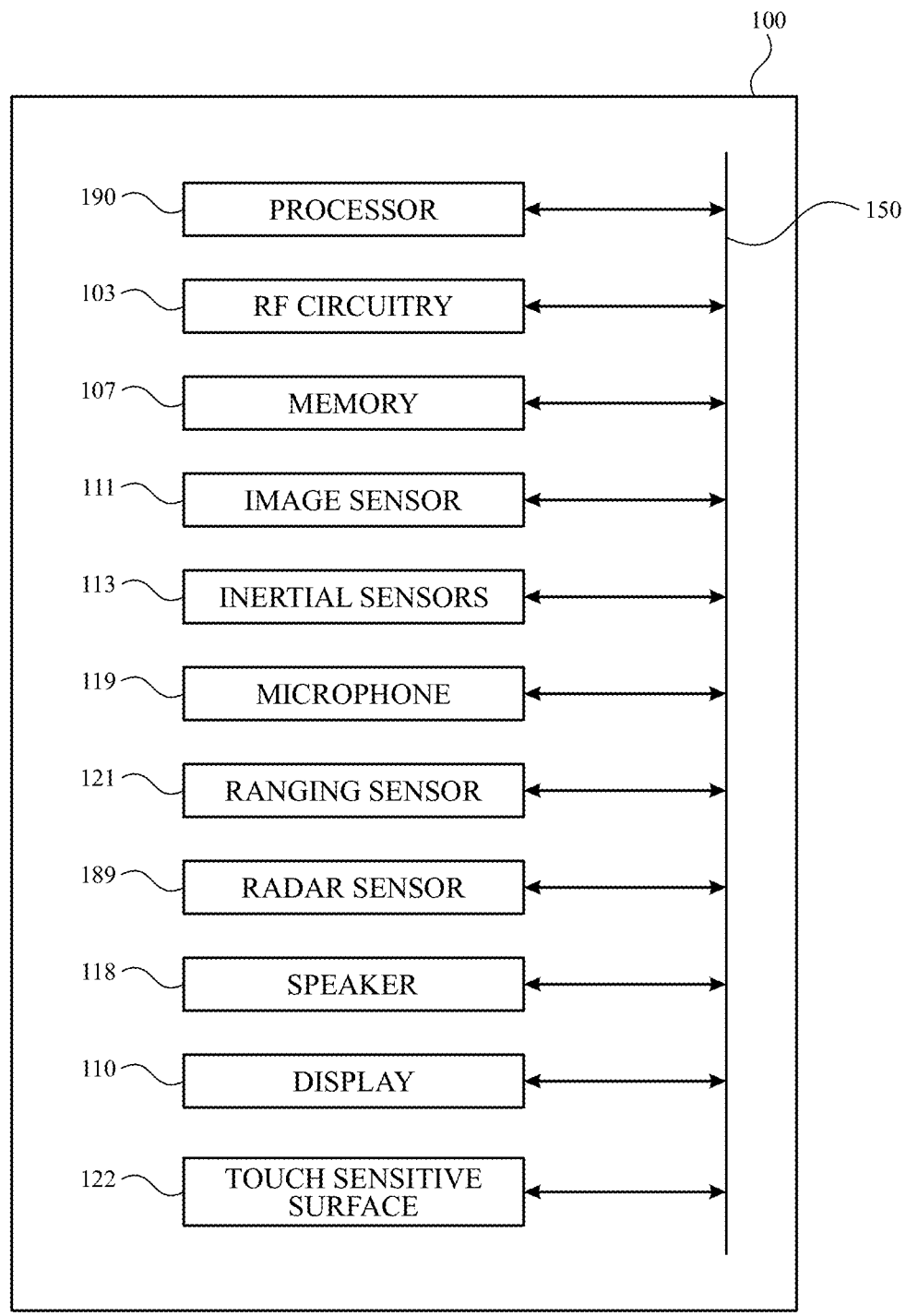

In some examples, as illustrated in FIG. 2, electronic device 100 includes various components, such as processor(s) 190, RF circuitry(ies) 103 (e.g., WiFi, Bluetooth, near field communications (NFC) or other RF communications circuitry), memory(ies) 107, image sensor(s) 111 (e.g., image sensors of a camera such as camera 112, or other imaging sensors), inertial sensor(s) 113 (e.g., one or more accelerometers, one or more gyroscopes, and/or one or more magnetometers), microphone(s) 119, radar sensor(s) 189 (e.g., implementations of radar sensor 116), ranging sensor(s) 121 such as LIDAR sensors, speaker(s) 118, display 110, and touch-sensitive surface(s) 122. These components optionally communicate over communication bus(es) 150 of electronic device 100.

In the example of FIG. 2, electronic device 100 includes processor(s) 190 and memory(ies) 107. Processor(s) 190 may include one or more general processors, one or more graphics processors, and/or one or more digital signal processors. In some examples, memory(ies) 107 may include one or more non-transitory computer-readable storage mediums (e.g., flash memory, random access memory, volatile memory, non-volatile memory, etc.) that store computer-readable instructions configured to be executed by processor(s) 190 to perform the techniques described below.

Electronic device 100 includes RF circuitry(ies) 103. RF circuitry(ies) 103 optionally include circuitry for communicating with electronic devices, networks, such as the Internet, intranets, and/or a wireless network, such as cellular networks and wireless local area networks (LANs). RF circuitry(ies) 103 optionally includes circuitry for communicating using near-field communication and/or short-range communication, such as Bluetooth®.

Electronic device 100 may include one or more displays, such as display 110. Display 110 may include an opaque display. Display 110 may include a transparent or semi-transparent display that may incorporate a substrate through which light representative of images is directed to an individual's eyes. Display 110 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display 110 include head up displays, automotive windshields with the ability to display graphics, windows with the ability to display graphics, lenses with the ability to display graphics, tablets, smartphones, and desktop or laptop computers. Alternatively, electronic device 100 may be designed to receive an external display (e.g., a smartphone). In some examples, electronic device 100 is a projection-based system that uses retinal projection to project images onto an individual's retina or projects virtual objects into a physical setting (e.g., onto a physical surface or as a holograph).

In some examples, electronic device 100 includes touch-sensitive surface(s) 122 for receiving user inputs, such as tap inputs and swipe inputs. In some examples, display 110 and touch-sensitive surface(s) 122 form touch-sensitive display(s).

Electronic device 100 may include image sensor(s) 111. Image sensors(s) 111 optionally include one or more visible light image sensors, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 111 also optionally include one or more event camera(s) configured to capture movement of physical elements in the physical setting. Image sensor(s) 111 also optionally include one or more depth sensor(s) configured to detect the distance of physical elements from electronic device 100. In some examples, electronic device 100 uses CCD sensors, event cameras, and depth sensors in combination to detect the physical setting around electronic device 100.

In some examples, radar sensor(s) 189 may include one or more millimeter (MM) wave radar sensors and/or one or more radar sensors configured to emit radar signals and receive reflected radar returns in a frequency range between 40 gigahertz (GHz) and 100 GHz (e.g., between 55 GHz and 65 GHz between 75 GHz and 82 GHz), between 26.5 GHz and 40 GHz, between 18-26.5 GHz, between 12.5-18 GHz, between 8-12.5 GHz, between 4-8 GHz, between 2-4 GHz, between 1-2 GHz, or between 0.3-1 GHz and/or a wavelength of between 0.75-0.30 cm, (e.g., between 5.45 mm and 4.61 mm or between 3.7 mm and 3.9 mm), between 11-7.5 mm, between 17-11 mm, between 24-17 mm, between 37.5-24 mm, between 75-37.5 mm, between 150-75 mm, between 300-150 mm, or between 1000-300 mm (as examples). For example, in or more implementations, radar sensor(s) 189 (e.g., including radar sensor 116) may include a mm wave transceiver configured to emit radar signals (e.g., millimeter wavelength electromagnetic waves), and to receive and detect reflections of the emitted radar signals from one or more objects in the environment around the electronic device 100. In one or more implementations, a mm wave radar sensor may be implemented in radar sensor(s) 189 to provide improved access to doppler characteristics in the radar returns (e.g., relative to other radar sensors and/or non-radar sensors).

In some examples, electronic device 100 includes microphones(s) 119 to detect sound from the user and/or the physical setting of the user. In some examples, microphone(s) 119 includes an array of microphones (including a plurality of microphones) that optionally operate in tandem, such as to identify ambient noise or to locate the source of sound in space of the physical setting.

Electronic device 100 may also include inertial sensor(s) 113 for detecting orientation and/or movement of electronic device 100 and/or the radar sensor(s) 189. For example, electronic device 100 may use inertial sensor(s) 113 to track changes in the position and/or orientation of electronic device 100, such as with respect to physical elements in the physical environment around the electronic device 100. Inertial sensor(s) 113 may include one or more gyroscopes, one or more magnetometers, and/or one or more accelerometers.

Figure 3:
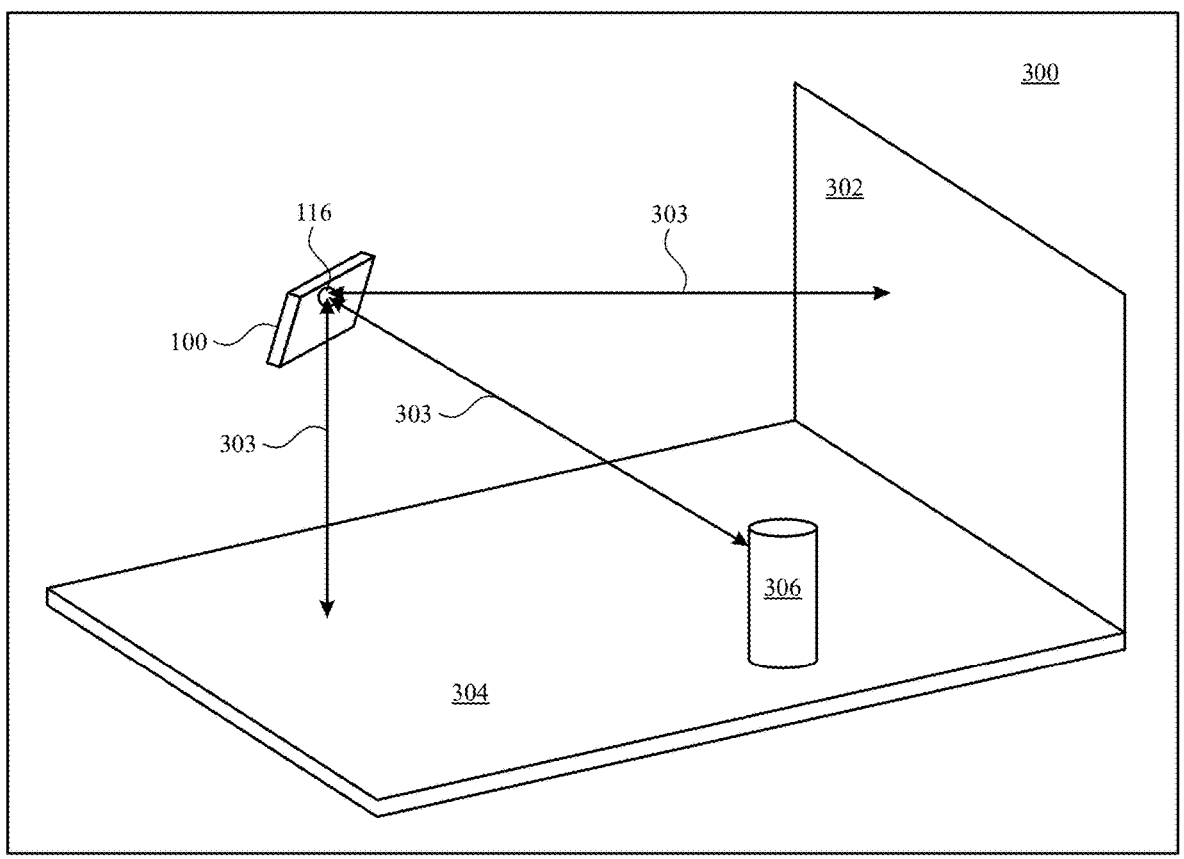
FIG. 3 illustrates an example of a physical environment of an electronic device in accordance with implementations of the subject technology.

FIG. 3 illustrates an example physical environment in which an electronic device such as electronic device 100 may be implemented and/or operated, according to aspects of the disclosure. In the example of FIG. 3, a physical environment 300 of the electronic device 100 includes a ground surface 304 (e.g., a floor or an outdoor ground surface), a planar surface 302 (e.g., a wall, a door, and/or a window), and physical object 306. The physical object 306 may be a stationary object (e.g., a column, a beam, a piece of furniture, an appliance, etc.) or a moving object (e.g., a person or an animal walking, running, or playing, or a moving machine such as a vehicle). As illustrated in FIG. 3, radar sensor 116 of the electronic device 100 may emit radar signals 303 and receive reflections of portions of the emitted radar signals 303 from various objects and/or surfaces in the physical environment 300, including the ground surface 304, the planar surface 302, and/or the physical object 306. Radar signals 303 may be electromagnetic waves having radar frequencies and wavelengths, such as electromagnetic waves having a frequency of between 40 gigahertz (GHz) and 100 GHz (e.g., between 55 GHz and 65 GHz between 75 GHz and 82 GHz), between 26.5 GHz and 40 GHz, between 18-26.5 GHz, 12.5-18 GHz, 8-12.5 GHz, 4-8 GHz, 2-4 GHz, 1-2 GHz, or 0.3-1 GHz and/or a wavelength of between 0.75-0.30 cm, (e.g., between 5.45 mm and 4.61 mm or between 3.7 mm and 3.9 mm), 11-7.5 mm, 17-11 mm, 24-17 mm, 37.5-24 mm, 75-37.5 mm, 150-75 mm, 300-150 mm, or 1000-300 mm (as examples).

In the example of FIG. 3, a single ground surface 304, a single planar surface 302, and a single physical object 306 that reflect the radar signals 303 from the radar sensor 116. However, it is appreciated that the physical environment 300 may include any number of ground surfaces, any number of planar and/or non-planar surfaces, and/or any number of stationary and/or moving physical objects 306 that can reflect the radar signals from the radar sensor 116, and can be detected, tracked, and/or classified using the reflected radar signals.

In one or more implementations, the electronic device 100 may also move within the physical environment 300. For example, a user of the electronic device 100 may carry or wear the electronic device 100 while moving (e.g., walking, running, or otherwise moving) within the physical environment 300.

Figure 4:
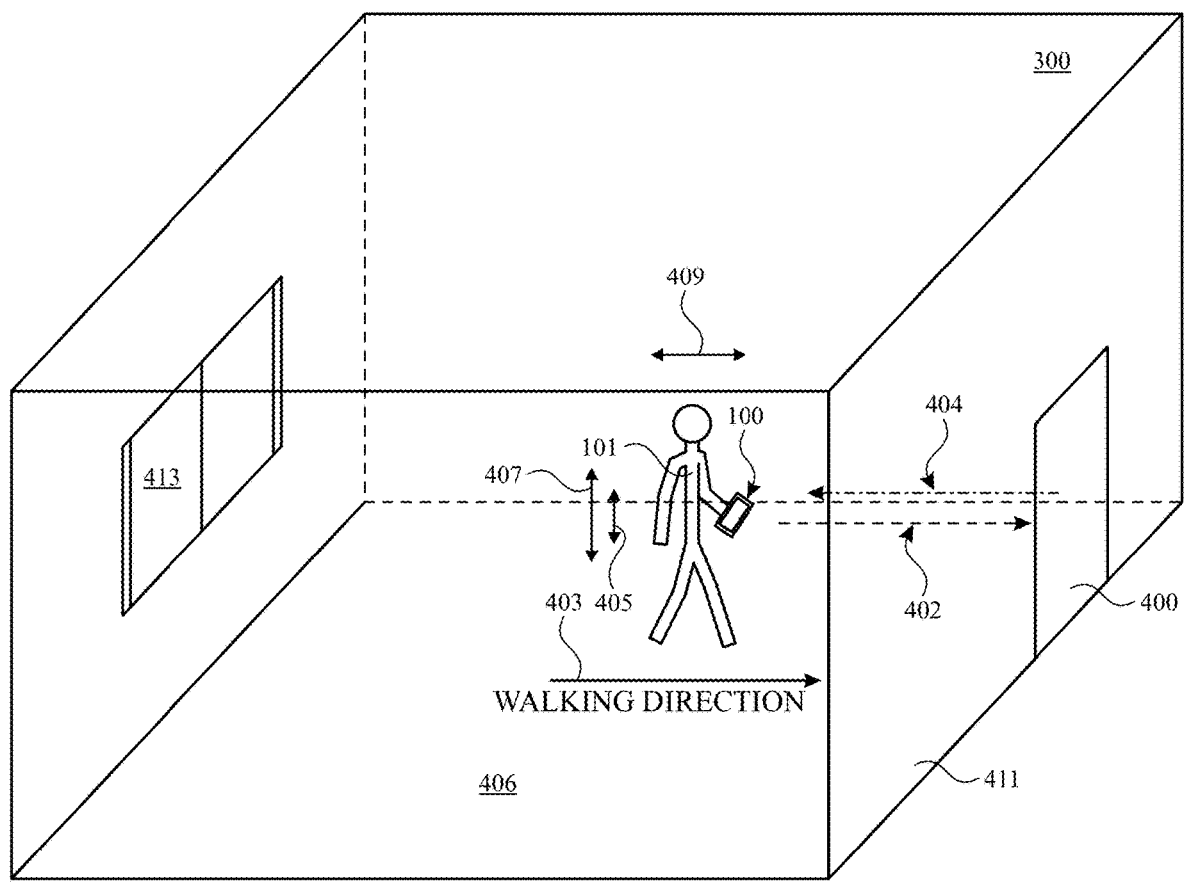
FIG. 4 illustrates example device motions and radar signals of an electronic device in a physical environment in accordance with one or more implementations of the subject technology.

For example, FIG. 4 illustrates an example use case in which a user 101 is carrying the electronic device 100 while walking in a direction 403 toward a door 400. As illustrated in FIG. 4, while the user 101 is walking in direction 403 while holding electronic device 100, the electronic device 100 may transmit a radar signal 402, and receive a reflected portion 404 of the transmitted radar signal 402, reflected by the door 400. Although not explicitly depicted in FIG. 4, other portions of the transmitted radar signal 402 may be reflected from a ground surface 406 on which the user 101 is walking, and/or other surfaces and/or objects, such as a wall 411 around the door 400, and/or a window 413.

As illustrated in FIG. 4, the electronic device 100 itself may move with various motions due to motions and/or vibrations of a platform on which the electronic device is moving, such as due to the walking motion of the user 101 in this example. As examples, the electronic device 100 may experience a vertical oscillatory motion 405 due to the motion of the user's body as the user walks. In implementations in which the electronic device 100 is held in the user's hand or worn on the user's wrist, the electronic device 100 may also experience a vertical oscillatory motion 407 and a horizontal oscillatory motion 409 due to an arm swinging motion of the user as the user walks. In one or more implementations, the electronic device 100 may experience and/or detect additional motions such as motions due to the leg swinging motion of the user as the user walks. In one or more implementations, time variations in the reflected portions 404 of the transmitted radar signal 402 due to the oscillatory motions 405, 407, and/or 409 can be used to classify and/or distinguish objects such as the door 400 and the wall 411. For example, in one or more implementations, time variations in surface features extracted from the reflected portions 404 of the transmitted radar signal 402, such as a time varying RCS, a time varying micro-doppler signal, and/or a time varying range, azimuth, and/or elevation can be used for detection, tracking, and/or classification of an object, such as the door 400 and/or the wall 411. In one or more implementations, tracking of device motion using an inertial sensor such as inertial sensor(s) 113 (see FIG. 2) may be used in combination with the radar signals to detect, track, and/or classify objects in the physical environment 300. In one or more implementations, the electronic device 100 may determine that the electronic device 100 is on a collision course with a detected and/or classified object, and generate a notification or an alert of a potential upcoming collision. In one or more implementations, the electronic device 100 may generate a notification or an alert other than a collision alert, such as an alert to indicate the presence of a particular object or type of object. In one or more implementations, radar signals may be used to correct or improve device motion tracking information generated by the inertial sensor(s).

Figure 5:
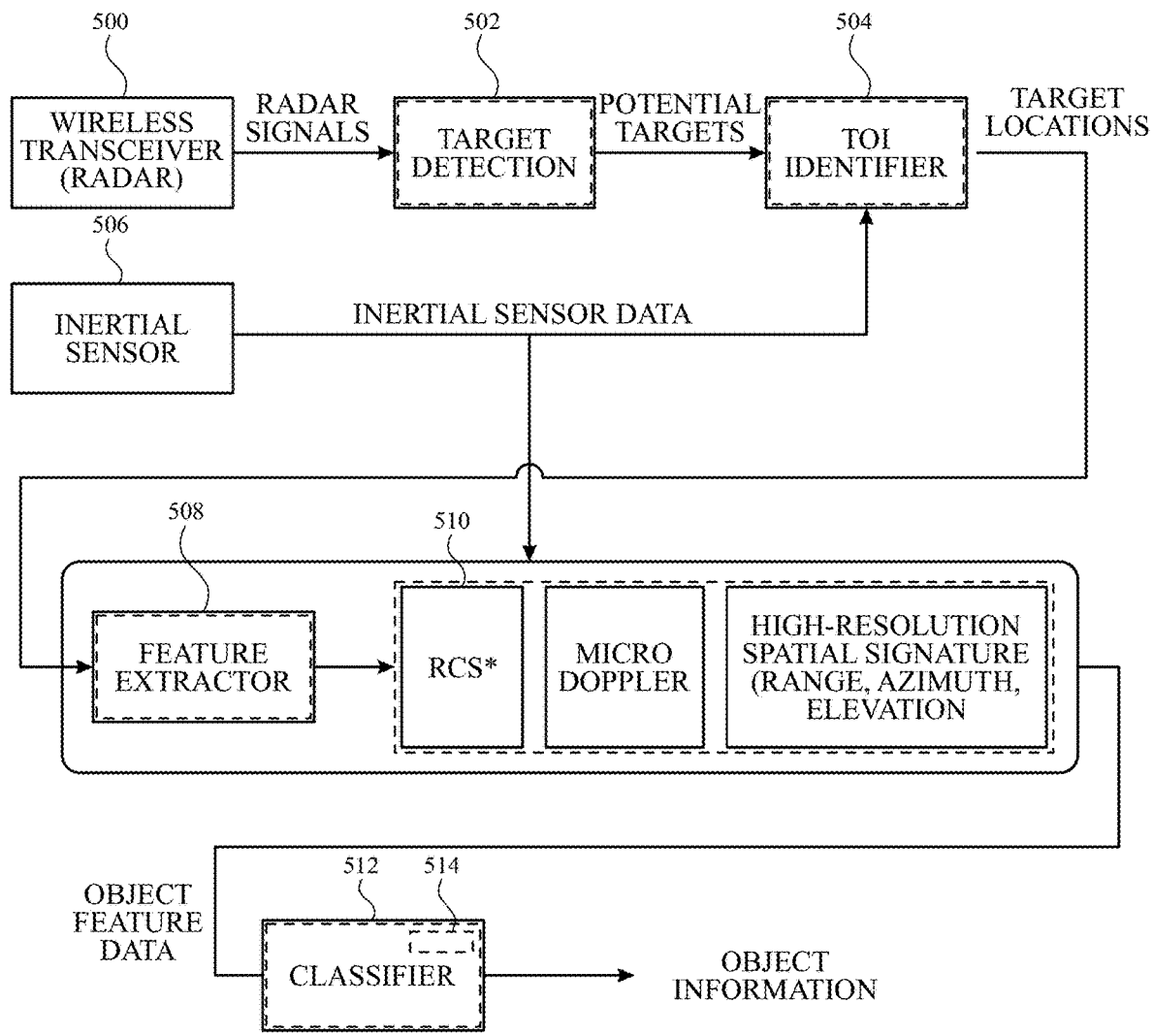
FIG. 5 illustrates a schematic diagram of an illustrative data flow for object classification using radar signals in accordance with implementations of the subject technology.

FIG. 5 illustrates an example data processing flow that may be performed for detection, tracking, and/or classification of objects using radar signals from a radar sensor of an electronic device. In the example of FIG. 5, a wireless transceiver (e.g., an implementation of radar sensor 116) provides radar signals to a target detection module 502. In one or more implementations, the wireless transceiver 500 may be a millimeter wave radar transceiver, such as a 60 GHz millimeter wave radar transceiver, that is configured to emit radar signals and receive portions of the radar signals that are reflected by various objects in the physical environment of the transceiver. The radar signals may include raw radar signals from the wireless transceiver 500 and/or may include range data, azimuth data, and/or elevation data associated with one or reflections.

The target detection module 502 may process the received radar signals and generate, for example, a point-cloud that contains points for all detected objects in the field of view of the wireless transceiver 500. The point cloud may be provided (e.g., as potential targets), to target-of-interest (TOI) identifier 504. As shown, an inertial sensor 506 (e.g., an implementation of inertial sensor(s) 113) may also provide inertial data (e.g., position and/or motion data for the wireless transceiver 500 and/or the electronic device 100 based on accelerometer data, gyroscope data, and/or magnetometer data) to the target-of-interest identifier 504. Using the point cloud from the target detection module 502 and inertial data from the inertial sensor 506, a subset of detected targets can be identified as targets of interest by the TOI identifier 504. For example, using the inertial data, the TOI identifier 504 may determine a direction of movement of the device, and identify targets in the point cloud that are located within a projected path of the device (e.g., within a bore-sight field of view of a device in one implementation, or within an angular range of the projected path in various other implementations), from among the targets detected by the target detection module 502, as targets of interest. As indicated in FIG. 5, target locations for the targets of interest may be provided from the TOI identifier 504 to a feature extractor 508.

In the example of FIG. 5, for a given target of interest that is identified by the TOI identifier 504, the feature extractor 508 may extract object feature data 510 (e.g., surface features, including static features and/or or time-varying features) from the radar signals. Examples of object feature data 510 (e.g., surface features) that can be extracted from radar signals include a time-varying radar cross-section (RCS), a micro-doppler feature, and high-resolution range/angle information. For example, common objects that are found in a physical environment often exhibit unique structural features that can induce a time-varying signature on the radar returns at a moving electronic device (e.g., an electronic device that is being carried or worn by a user moving around the physical environment). As examples, glass doors are often formed from a single pane of glass, windows are often formed from double pained glass, and interior walls are often formed from multi-layered sheetrock. As the wireless transceiver 500 approaches an object (e.g., while implemented in a moving electronic device, such as electronic device 100), the structure of the object (e.g. one or more surfaces of one or more glass layers) may impose a multipath condition on the reflected signal that varies with time due to constructive/destructive interference by reflections from different surfaces. The signal reflected from the object can be processed to extract the (e.g., time-varying) signature that represents the physical structure.

As shown, the object feature data 510 extracted by the feature extractor 508 may be provided to a classifier 512. In one or more implementations, classifier 512 may include a machine learning model 514 that has been trained to classify objects based on object feature data obtained, at least in part, on radar signals (e.g., radar reflections). For example, responsive to providing an input including a given set of measured surface features (e.g., object feature data 510), the classifier 512 (e.g., machine learning model 514) can provide an output that includes object information for a detected object of interest. In one or more implementations, the object information may include an object type. Example object types that may be identified by the classifier may include a standing human, a sitting human, a walking human, a running human, a glass wall, a glass window, a wooden wall, a wooden door, a sheetrock wall, a sheetrock door. In one or more implementations, the classifier 512 may also output a classification probability or confidence level that indicates the confidence with which the object has been classified.

In the example of FIG. 5, a captured radar signal is processed to detect and classify one or more objects. At the output of FIG. 5, object information for one or more detected objects can be provided to one or more higher layer applications (e.g., a collision warning application, another notification or alert system, a dead reckoning system, etc.) at the device or at another device or system for further processing, as described herein. For each detected object of interest, the object information may include, for example, a range to the object, one or more angles (e.g., an azimuth and/or an elevation), a speed or velocity, and/or an object type. Detecting an object may include detecting a reflected radar signal and determining a location from which the radar signal was reflected (e.g., using target detection module 502 and/or TOI identifier 504). Classifying a detected object may include determining (e.g., using classifier 512) the object type and/or an object material of the detected object (e.g., determining that the detected object is a wall, a window, a person, and/or formed from glass, concrete, wood, other materials in one or more layers such as planar or non-planar layers). In one or more implementations, the probability or confidence level that is output by the classifier with an object type may be used by an application or process at the electronic device 100 to determine whether to take action (e.g., provide an alert, or display a classification) based on the identified object type.

Figure 6:
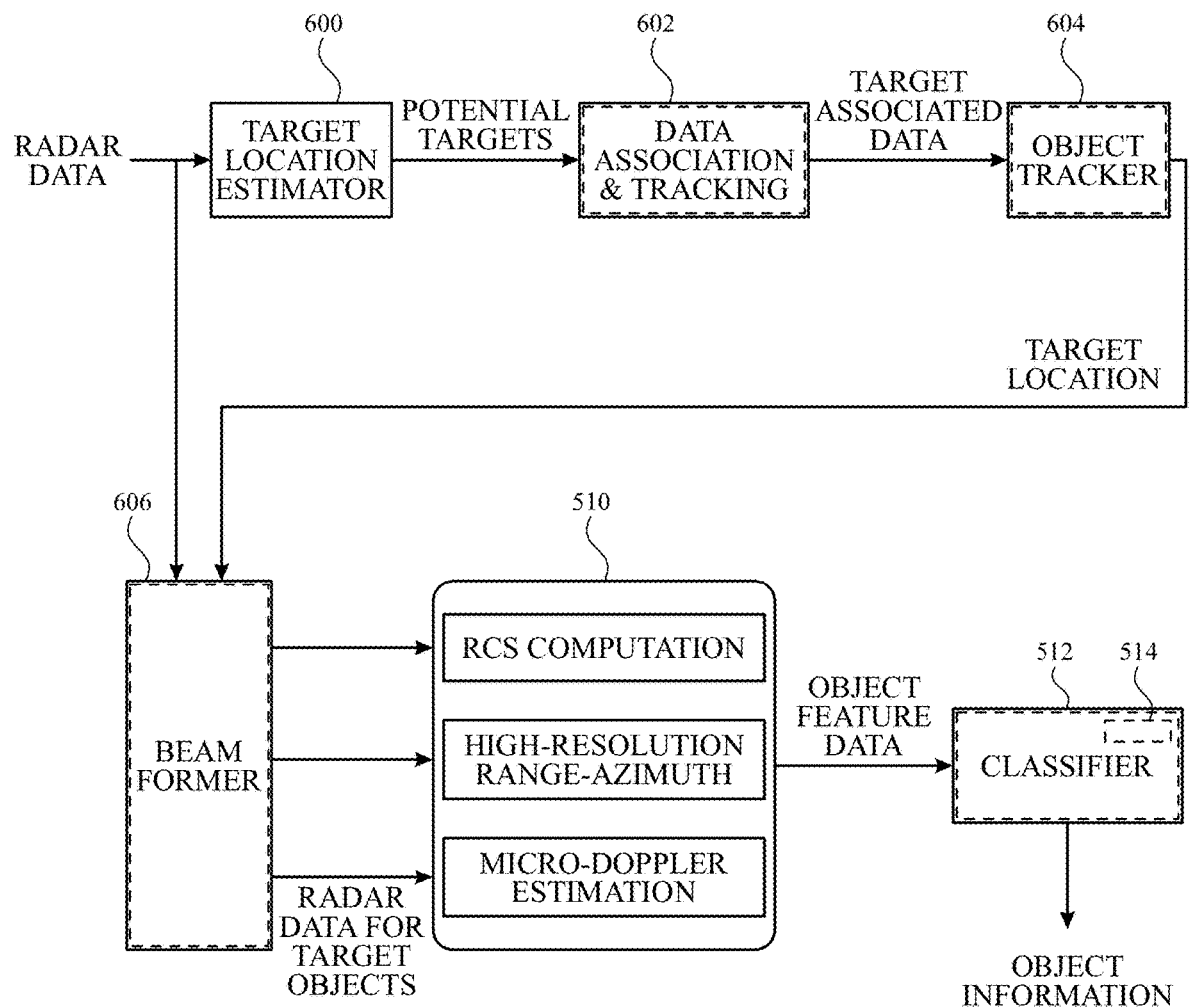
FIG. 6 illustrates a schematic diagram of an illustrative data flow for feature extraction from radar signals in accordance with implementations of the subject technology.

FIG. 6 illustrates additional details of the target detection and TOI identification operations of FIG. 5, in accordance with one or more implementations. In the example of FIG. 6, radar data (e.g., a radar data cube from the wireless transceiver 500 of FIG. 5, the radar data cube including processed received signals that contain range, angle and/or doppler information for all potential targets) may be provided to a target location estimator 600 (e.g., implemented as or as part of the target detection module 502 of FIG. 5). In one or more implementations, the target location estimator 600 may estimate target locations for all potential targets by performing a spectral estimation operation (e.g., a 2D fast Fourier transform (FFT)). The output of the target location estimator 600 may be provided to a Constant False Alarm Rate (CFAR) detector to extract the detection point cloud described above in connection with FIG. 5. As shown in FIG. 6, the target detections (e.g., the point cloud) may be passed from the target location estimator 600 to a data association and tracking module 602. The data association and tracking module 602 may track one or more of the detected targets over time, as objects. As shown, the data association and tracking module 602 may provide a target location estimate for each tracked object at a time-sample, to a beam former 606. The beam former 606 may apply beam forming to the radar data cube using the provided target location, to isolate a given target corresponding to the target location from the other targets detected by the target location estimator 600. Using the beam formed radar signals, for each tracked target, the RCS, a micro-doppler signal, and a high-resolution range-azimuth may be estimated for each frame or sample time. As shown, the object feature data 510 of a given target may then be passed to the classifier 512 (e.g., to the machine learning model 514) to classify the detected object.

In the examples of FIGS. 5 and 6, the elements indicated with dashed boxes (e.g., the target detection module 502, the TOI identifier 504, the feature extractor 508, the classifier 512, the machine learning model 514, the target location estimator 600, the data association and tracking module 602, the object tracker 604, and the beam former 606) may be implemented in hardware, software (e.g., stored in memory (ies) 107 and executed by processor(s) 190), or a combination of hardware and software. In the examples of FIGS. 5 and 6, the elements indicated by dashed boxes (e.g., the target detection module 502, the TOI identifier 504, the feature extractor 508, the classifier 512, the machine learning model 514, the target location estimator 600, the data association and tracking module 602, the object tracker 604, and the beam former 606) are indicated as being implemented separately. In other implementations, one or more or all of the target detection module 502, the TOI identifier 504, the feature extractor 508, the classifier 512, the machine learning model 514, the target location estimator 600, the data association and tracking module 602, the object tracker 604, and the beam former 606 may be implemented as parts of a common processing module. In the examples of FIGS. 5 and 6, the elements indicated only with solid rectilinear boxes may include at least one or more hardware components, such as sensing elements and/or emitters, which may be implemented using antennas and/or readout circuitry.

Figure 7:
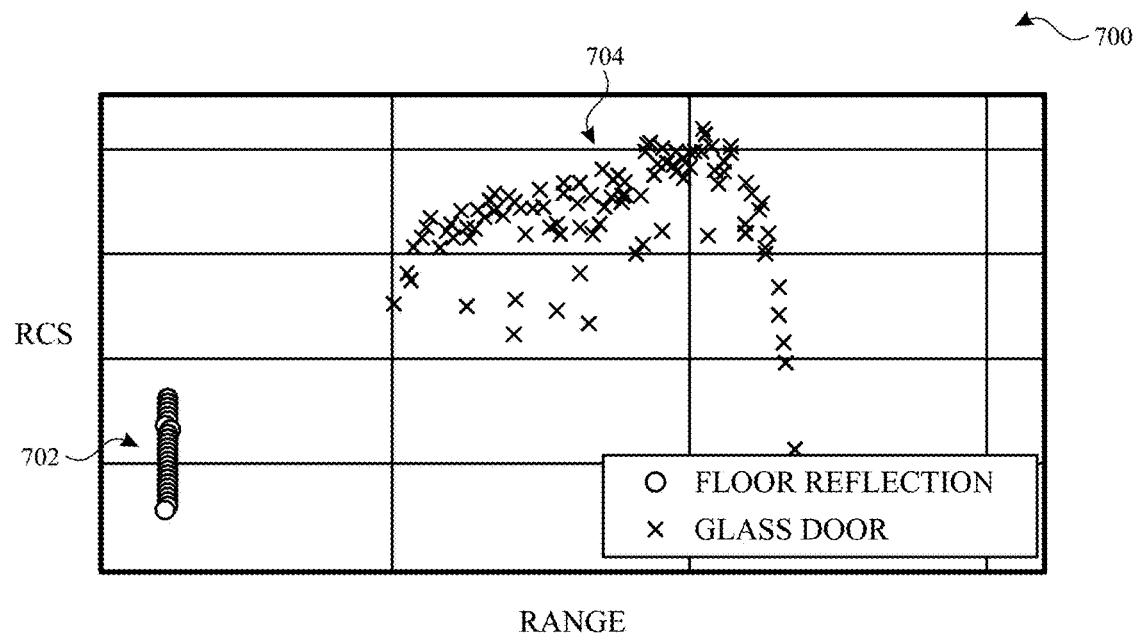
FIGS. 7-9 illustrate example surface features that can be extracted from radar signals in accordance with implementations of the subject technology.
Figure 8:
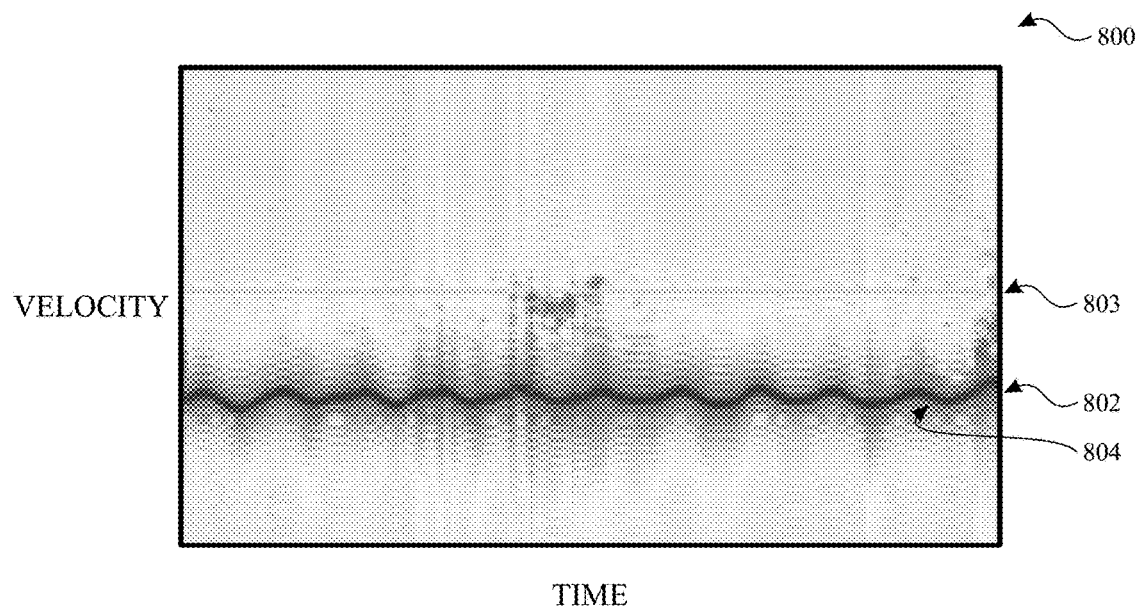
Figure 9:
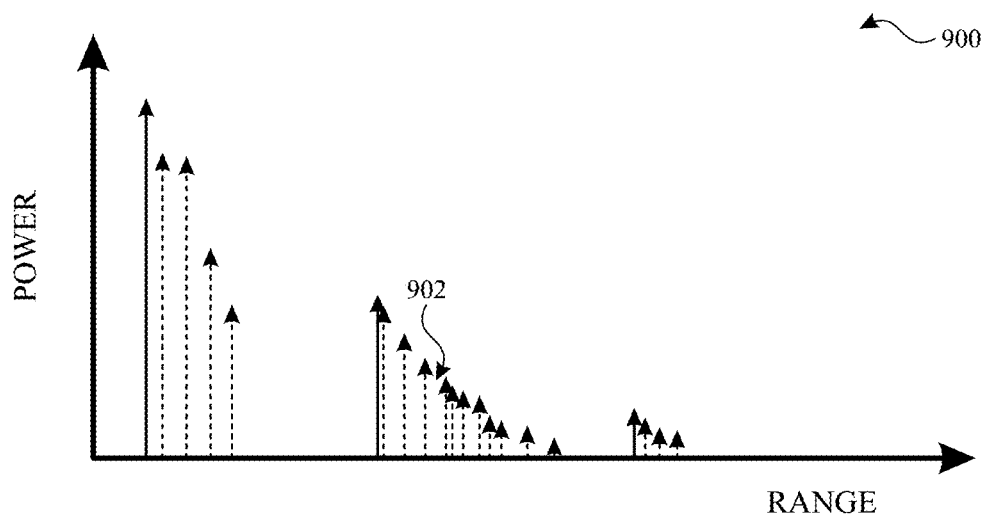

FIGS. 7, 8, and 9 illustrate examples of surface features (e.g., examples of the extracted surface features that may be included in the object feature data 510) that can be extracted from radar signals and used for object detection, classification, and/or tracking. As one example, FIG. 7 illustrates a graph 700 of RCS measurements versus range to the reflecting object taken over time. The RCS measurements of FIG. 7 can be made using a radar sensor, such as the radar sensor 116 of electronic device 100, in an example use case. In the example of FIG. 7, radar reflections received by the radar sensor include first reflections from a ground surface (e.g., the floor under the device) and second reflections from a glass door, received while the electronic device including the radar sensor is being carrier or worn by a user that is walking toward the glass door. As shown, when the RCS and the range of detected objects corresponding to the floor and the glass door are generated over time as the range to the floor remains substantially constant and the range to the glass door changes, the RCS measurements 702 of the floor and the RCS measurements 704 of the glass door are distinct from each other, and have different variation patterns. Thus, the RCS variations over time can be used (e.g., using machine learning model 514 trained using RCS variation training data) to identify the object being tracked as a glass door.

FIG. 8 illustrates a graph 800 of a micro-doppler feature measured using a radar sensor, such as the radar sensor 116 of an electronic device 100, in the same example use case described above in connection with FIG. 7. In the example of FIG. 8, the velocity of the glass wall, relative to the electronic device 100, is measured using the doppler shift of the radar reflections from the glass wall. As shown in FIG. 8, the measured velocity of the glass door includes a mean value 802 that is doppler shifted from mean zero 803 by an amount that corresponds to the mean speed of the walking user. As shown, the measured velocity of the glass door also includes micro-doppler features such as oscillations 804 that oscillate with a frequency that corresponds to the cadence of the device user's gait.

FIG. 9 illustrates a power-range profile 900 that shows the power 902 (e.g., which, during device use, can be measured using a radar sensor, such as the radar sensor 116 of an electronic device 100), versus the range to an object (e.g., a glass door in a use case similar to the example use case described above in connection with FIGS. 7 and 8). In the example of FIG. 9, the power (e.g., of the reflected radar signal) generally increases with reduced range to the glass door, and represents the power-range profile of both the surface of the glass door and internal structure reflections from multiple surfaces of the glass door. For example, the power-range profile of a glass door formed from a single pane of glass (e.g., with two outer surfaces that interface with the air) may be different from the power-range profile of glass window formed from multiple panes of glass, a sheetrock wall, a piece of furniture, a column, or a person in a way that is distinguishable by the classifier 512 (e.g., the machine learning model 514). For example, the ranges extracted from the radar signals for the power-range profile may be extracted with sufficiently high resolution for differences in the surface smoothness and/or the number of surfaces that form the object to affect the shape of the power-range profile. In one or more implementations, the shape of the power-range profile may be used (e.g., alone or in combination with the micro-doppler feature and/or the RCS) to classify or otherwise identify a detected object.

For example, when a target of interest (TOI) is identified by an electronic device, one or more high-resolution feature extraction processes at the electronic device can provide a high-resolution estimate of the power-range profile of the TOI. For example, beam-forming operations can be applied to radar returns from glass to isolate two or more separate surface reflections. Then, applying a high-resolution feature extraction process to the beam formed returns, the electronic device can estimate the power-range profile of the multiple internal reflections of the object (e.g. internal reflections of two surfaces of single-pained glass or four surfaces of double-pained glass). In this way, a high-resolution power-range profile of the TOI, such as is illustrated in FIG. 9, can then be used as a feature in the classification process of the TOI.

Although a power-range profile is illustrated in FIG. 9, it is appreciated that power-angle profiles and/or range-angle profiles extracted from radar returns can also be used in the classification of object. For example, power-angle profiles may include a power-azimuth profile and/or a power-elevation profile. For example, a range-angle profile may include a range-azimuth profile and/or a range-elevation profile. In one or more implementation, a power-range-azimuth profile and/or a power-range-elevation profile may also be extracted from radar returns and used to classify one or more objects. For example, the time variation of any or all of a power-azimuth profile, a power-elevation profile, a range-azimuth profile, a range-elevation profile, a power-range-azimuth profile, and/or a power-range-elevation profile may vary in a way that is characteristic of a particular object and/or object type.

Figure 10:
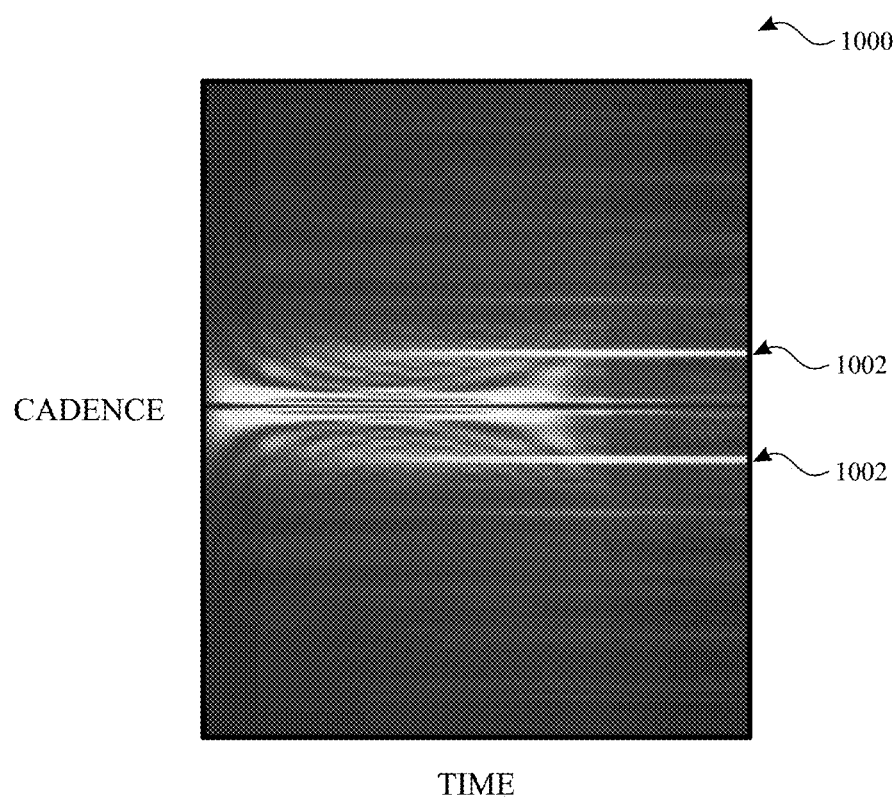
FIG. 10 illustrates an example frequency-space feature that can be extracted from radar signals in accordance with implementations of the subject technology.

In the examples of FIGS. 7-9, features that may be used to classify an object using radar data are illustrated in time-space. In one or more implementations, frequency-space data generated from radar signals can also, or alternatively be used for object detection, tracking and/or classification. As an example, FIG. 10 illustrates a transform 1000 of the micro-doppler feature of FIG. 8, in which the cadence 1002 can be seen, and can be seen to be substantially constant over time. The cadence 1002 may correspond to the frequency of the oscillations 804 of FIG. 8, and to the cadence of the user's steps as the user walks toward the glass door.

Figure 11:
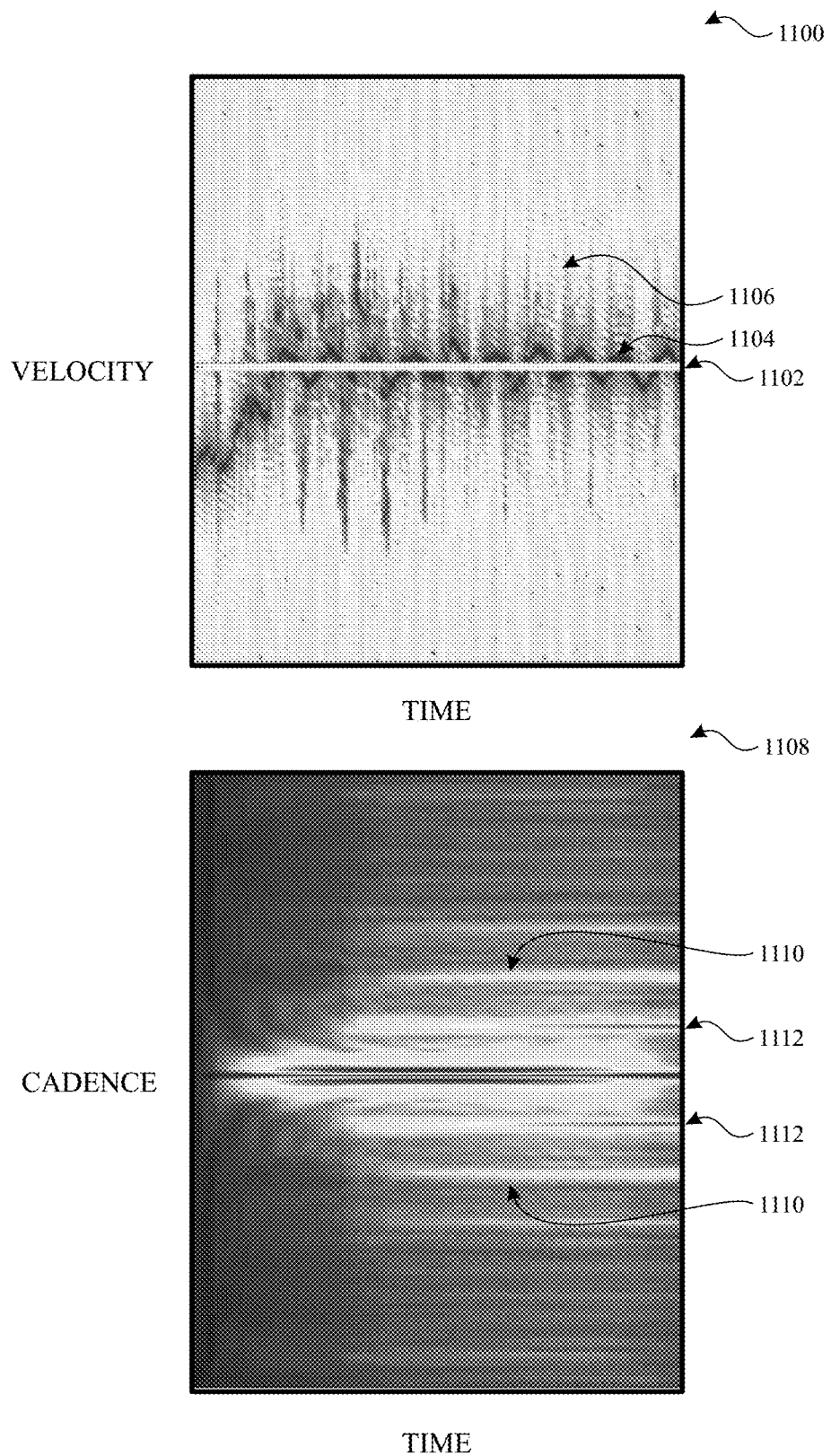
FIG. 11 illustrates additional example surface features and frequency-space features that can be extracted from radar signals in accordance with implementations of the subject technology.

In one or more implementations, object detection, tracking, and/or classification can also include comparisons of radar features of multiple objects. For example, FIG. 11 includes a micro-doppler graph 1100, and a frequency transform 1108, extracted from radar reflections from the floor, while the user of the example of FIGS. 7-10 is walking toward the glass door. As shown, the mean velocity 1102 of the floor, measured using the doppler shift of the radar reflections from the floor has a value of substantially zero (e.g., due to the substantially constant mean height of the device being carried or worn by the walking user). As shown, the micro-doppler feature of the floor also includes oscillations 1104 that oscillate with a frequency that corresponds to the cadence of the user's gait. In the example of FIG. 11, additional velocity oscillations 1106 can also be seen that correspond to the leg-swing motion of the user's legs while walking. In one or more use cases, arm-swing motions of the user's arms while walking may also generate additional oscillations in the micro-doppler features. The frequency transform 1108 of FIG. 11 also shows a first cadence 1112 that corresponds to the frequency of the oscillations 1104, and a second cadence 1110 that corresponds to the oscillations 1106.

In one or more implementations, by comparing the micro-doppler feature of a ground reflection with the micro-doppler feature of the incoming glass wall of the example of FIGS. 7-10, it is possible to see that there is a high correlation between the micro-doppler features. In one or more implementations, the electronic device 100 may determine that the glass wall (or another stationary object) is stationary, by determining that the cadence 1002 is substantially the same as (e.g., within a predetermined similarity threshold) the cadence 1112. As an alternative example, radar reflections of a moving object, such as another person walking toward or away from the user, would include oscillations as the cadence of the gait of the other person and/or arm swing motions of the other person, which would have a lower or no correlation with the cadence(s) of the user of the electronic device 100.

Figure 12:
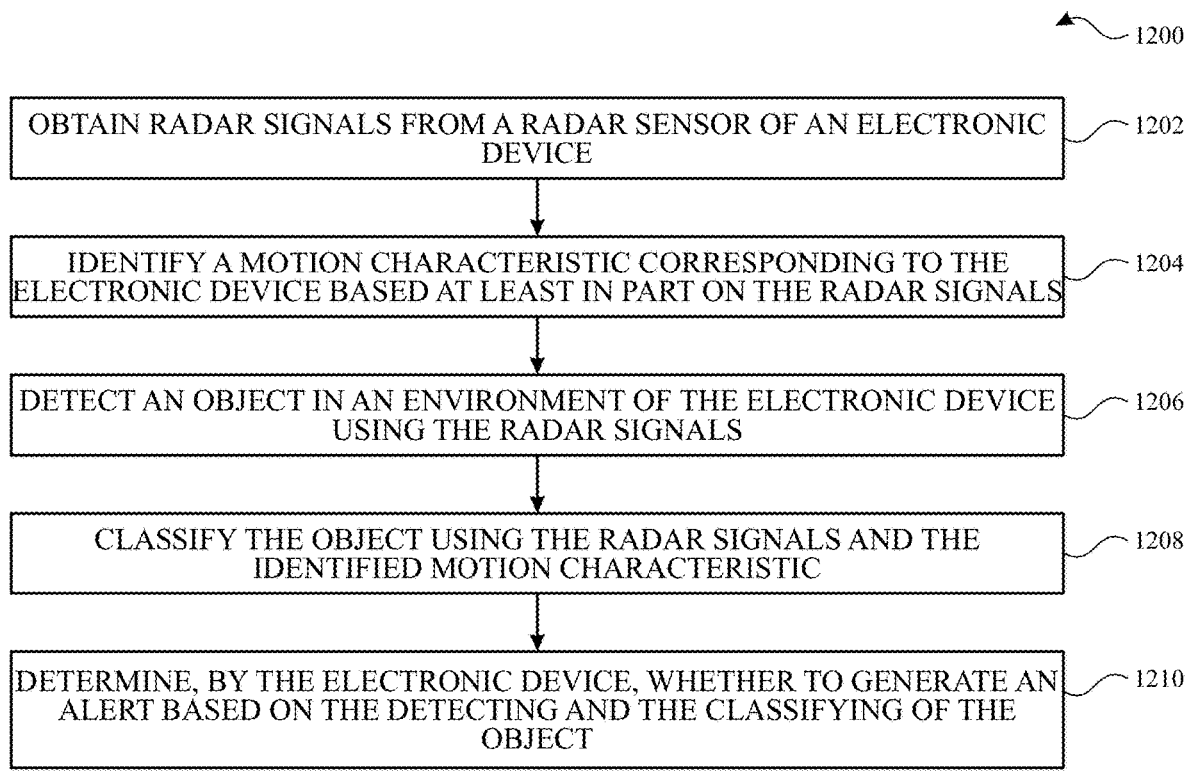
FIG. 12 illustrates a flow chart of example operations that may be performed for object classification using user motion information extracted from radar signals in accordance with implementations of the subject technology.

FIG. 12 illustrates a flow diagram of an example process 1200 for providing object detection, tracking, and/or classification in accordance with implementations of the subject technology. For explanatory purposes, the process 1200 is primarily described herein with reference to the electronic device 100 of FIGS. 1 and 2. However, the process 1200 is not limited to the electronic device 100 of FIGS. 1 and 2, and one or more blocks (or operations) of the process 1200 may be performed by one or more other components of other suitable devices or systems. Further for explanatory purposes, some of the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

As illustrated in FIG. 12, at block 1202, an electronic device (e.g., electronic device 100) may obtain radar signals from a radar sensor (e.g., radar sensor 116) of the electronic device. Obtaining the radar signals may include emitting, with the radar sensor, radar signals, and receiving reflected portions of the emitted signals. The reflected portions may be reflected from one or more objects in the physical environment of the electronic device.

At block 1204, the electronic device may identify a motion characteristic corresponding to the electronic device based on the radar signals. The motion characteristic may include, as examples, characteristics of a walking motion, a leg swing motion, and/or an arm swing motion. In one or more implementations, identifying the motion characteristic may include identifying, using the radar signals (e.g., using feature extractor 508), a first cadence corresponding to the walking motion.

At block 1206, the electronic device may detect an object in an environment of the electronic device using the radar signals. For example, detecting the object may include performing any or all of the operations described herein in connection with the target detection module 502, the TOI identifier 504, the feature extractor 508, the target location estimator 600, the data association and tracking module 602, and the object tracker 604 of FIGS. 5 and 6 (e.g., to determine the presence of an object based on reflected radar signals and to determine a location of the reflecting object).

At block 1208, the electronic device may classify (e.g., with the classifier 512) the object using the radar signals and the identified motion characteristic. In one or more implementations, classifying the object may include classifying the object as a moving object or a stationary object. In one or more implementations, classifying the object may also, or alternatively, include determining an object type for the object. As examples, an object type may be a human, a glass wall, a glass window, a wooden door, a sheetrock wall, etc. In one or more implementations, identifying the object type may include extracting surface features from the radar signals, and providing the surface features to a classifier, such as the classifier 512 of FIGS. 5 and 6, and obtaining an output of the classifier. For example, providing the surface features to the classifier may include providing the surface features to a machine learning model, such as machine learning model 514, that has been trained to identify object types based on surface features extracted from radar signals.

For example, in a use case in which the object is stationary object, classifying the object may include identifying, using the radar signals (e.g., using feature extractor 508), a second cadence corresponding to the object; and determining (e.g., with the classifier 512) that the second cadence substantially matches the first cadence. For example, as discussed above in connection with FIGS. 4, 8, 10, and 11, the second cadence may correspond to an oscillatory motion of the electronic device with respect to the stationary object, due to the motion of the user that is carrying or wearing the electronic device. For example, in one or more implementations, identifying the first cadence using the radar signals may include identifying the first cadence using a first portion of the radar signals corresponding to a reflection from a ground surface, and identifying the second cadence using the radar signals may include identifying the second cadence using a second portion of the radar signals corresponding to a reflection from the object.

As discussed herein, in one or more implementations, detection and tracking of objects that have been determined to be stationary objects using a radar sensor can be used to improve and/or correct tracking of device motion, as determined by other sensors, such as GPS sensors and/or IMU sensors. In one or more implementations, the electronic device may track motion of the electronic device using a sensor of the electronic device other than the radar sensor. The electronic device may determine a location of the stationary object using the radar signals, and modify (e.g., correct) the tracking of the motion of the electronic device based on the location of the stationary object.

In one use case, the object may be a stationary planar object. In one or more use cases, the stationary planar object may include a pane of glass (e.g., a pane of glass that forms or is part of a glass wall, a glass door, or a window). In one or more implementations, classifying the object at block 1208 may include classifying the object as glass (e.g., using the machine learning model 514 or another classification engine that is configured to distinguish between glass, wood, sheetrock, and/or metal planar surfaces using radar signals, as described herein).

In one or more implementations, identifying the motion characteristic may include determining a velocity of the electronic device (e.g., and the user carrying or wearing the electronic device) relative to the pane of glass.

At block 1210, the electronic device may determine whether to generate an alert based on the detecting and classifying of the object. In one or more implementations, the electronic device may determine whether to generate the alert, at least in part, by determining a time-to-impact between the electronic device and the pane of glass based on the velocity.

For example, the electronic device may determine whether to generate the alert, e.g., a collision alert, at least in part by determining that the time-to-impact satisfies (e.g., is less than and/or equal to) a threshold for generating the alert. The electronic device may generate the alert, for example, responsive to determining that the time-to-impact satisfies the threshold. In this way, the electronic device can help the device and/or a device user of the device to avoid collisions with glass doors or glass walls, or other glass or other optically transparent objects that may be difficult for the device and/or the user to visually detect alone, in one or more implementations.

Although the example discussed above describes a use case in which the object is a stationary object, in other use cases, the object may be a moving object (e.g., another person walking near the electronic device or another moving object). In a use case in which the object is a moving object, classifying the object may include identifying, using the radar signal, a second cadence corresponding to the object, and determining that the second cadence is different from the first cadence. For example, the second cadence may correspond to a walking motion of another person and/or an arm swing motion or other motion of the other person, that differs from the cadence of the motion(s) of the user of the electronic device in frequency, phase, and/or amplitude. In this use case, identifying the first cadence using the radar signals may include identifying the first cadence using a first portion of the radar signals corresponding to a reflection from a ground surface, and identifying the second cadence using the radar signals may include identifying the second cadence using a second portion of the radar signals corresponding to a reflection from the object, the object being different from the ground surface.

In one or more implementations, motion characteristic corresponding to the electronic device may be the result of one or more characteristics of user motion of a device user of the electronic device. For example, the electronic device may determine, based on the identified motion characteristic, a stride length of the user (e.g., based in part on the first cadence). In one or more implementations, the electronic device may also generate health data for the user based on the stride length. For example, in one or more implementations, the electronic device may determine a step count corresponding to a number of steps taken by the user based on the radar signals. The electronic device may also determine a distance traveled by the user based on the radar signals and/or other sensor signals. For example, the distance traveled may be determined using an inertial sensor and/or a GPS sensor of the electronic device. In one or more implementations, the electronic device may modify (e.g., improve or correct) the traveled distance using the determined stride length and/or other radar signal data. In one or more other implementations, the electronic device may determine the distance traveled directly from the radar data and independently of other sensor data (e.g., independently of inertial sensor data).

Figure 13:
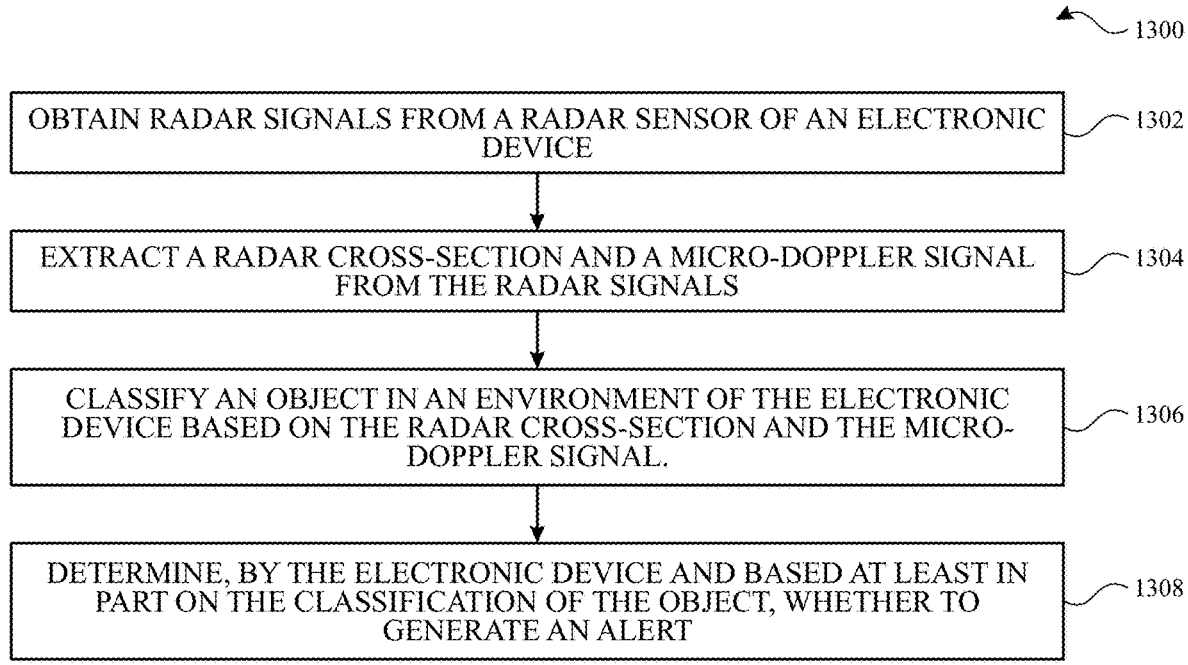
FIG. 13 illustrates a flow chart of example operations that may be performed for object classification using surface features extracted from radar signals in accordance with implementations of the subject technology.

FIG. 13 illustrates a flow diagram of another example process 1300 for providing object detection, tracking, and/or classification in accordance with implementations of the subject technology. For explanatory purposes, the process 1300 is primarily described herein with reference to the electronic device 100 of FIGS. 1 and 2. However, the process 1300 is not limited to the electronic device 100 of FIGS. 1 and 2, and one or more blocks (or operations) of the process 1300 may be performed by one or more other components of other suitable devices or systems. Further for explanatory purposes, some of the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

As illustrated in FIG. 13, at block 1302, an electronic device (e.g., electronic device 100) may obtain radar signals from a radar sensor (e.g., radar sensor 116) of the electronic device. Obtaining the radar signals may include emitting, with the radar sensor, radar signals, and receiving reflected portions of the emitted signals. The reflected portions may be reflected from one or more objects in the physical environment of the electronic device.

At block 1304, the electronic device (e.g., feature extractor 508) may extract a radar cross-section (RCS) and a micro-doppler signal from the radar signals. In one or more implementations, the electronic device may also extract a range and an angle (e.g., an azimuth and/or an elevation) for the object from the radar signals.

At block 1306, the electronic device may classify (e.g., with classifier 512 and/or machine learning model 514) an object in an environment of the electronic device based on the radar cross-section and the micro-doppler signal. In one or more implementations, classifying the object based on the radar cross-section and the micro-doppler signal may include classifying the object based on a time variation of the radar cross-section (e.g., as described in connection with the example of FIG. 7) and a time variation of the micro-doppler signal (e.g., as described in connection with the example of FIGS. 8, 10 and 11). In one or more implementations, the signal reflected from the object can be processed to extract the signature that represents the physical structure. For example, in one or more implementations, classifying the object based on the time variation of the radar cross-section and the micro-doppler signal may include distinguishing between an opaque planar surface and a transparent planar surface using at least the time variation of the radar cross-section. For example, as the radar sensor approaches the object, the structure of the object (e.g. internal glass layers) may impose a multipath condition that varies with time due to constructive/destructive interference.

As described herein, in one or more implementations, classifying the object may include providing the radar cross-section and the micro-doppler signal to a machine learning engine (e.g., machine learning model 514) at the electronic device, and obtaining an object classification as an output from the machine learning engine.

In one or more implementations, prior to classifying the object at block 1306, the electronic device (e.g., target detection module 502 and/or target location estimator 600) may perform an initial target detection using the radar signals. The electronic device (e.g., TOI identifier 504 and/or object tracker 604) may determine a location of a potential target object based on the initial target detection. The electronic device (e.g., feature extractor 508 and/or beam former 606) may extract the radar cross-section and the micro-doppler signal (e.g., and a range and/or one or more angles) from the radar signals based on the location (e.g., as described above in connection with FIGS. 5 and 6). In one or more implementations, extracting the radar cross-section and the micro-doppler signal (e.g., and a range and/or one or more angles) from the radar signals based on the location may include performing a beam forming operation on the radar signals using the location (e.g., as described above in connection with FIG. 6).

At block 1308, the electronic device may determine, based at least in part on the classification of the object, whether to generate an alert. For example, the electronic device may determine that the object is a stationary object or a moving object (e.g., and/or whether the object is an visible opaque object or a transparent object such as a window or a glass wall or door) and determine whether to generate the alert by determining a velocity of the device relative to the object, and a time-to-impact between the device and the object based on the velocity. In one or more implementations, if the velocity and/or the time-to-impact satisfy a threshold, the electronic device may determine that the alert is to be generated, and generate the alert. As discussed herein, an alert generated by the electronic device may include an auditory alert, a tactile alert, and/or a visual alert.

Figure 14:
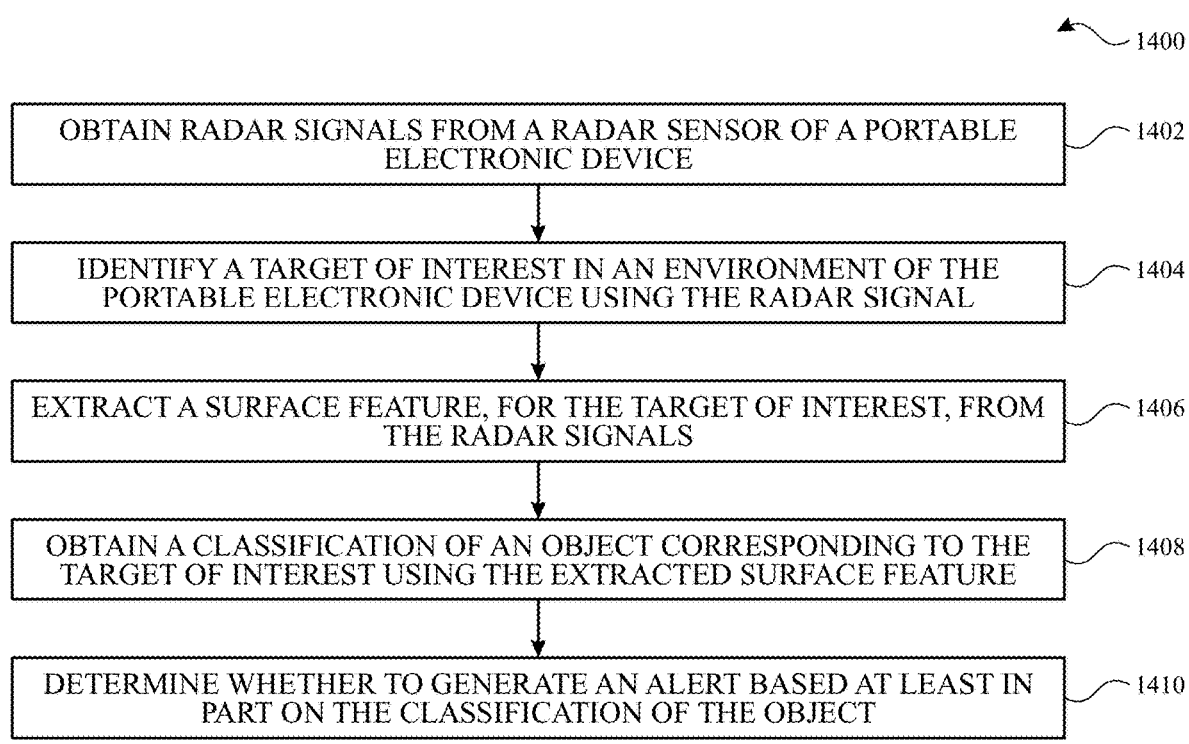
FIG. 14 illustrates a flow chart of example operations that may be performed for object classification by a portable electronic device having a radar sensor in accordance with implementations of the subject technology.

FIG. 14 illustrates a flow diagram of an example process 1400 for providing object detection, tracking, and/or classification in accordance with implementations of the subject technology. For explanatory purposes, the process 1400 is primarily described herein with reference to the electronic device 100 of FIGS. 1 and 2. However, the process 1400 is not limited to the electronic device 100 of FIGS. 1 and 2, and one or more blocks (or operations) of the process 1400 may be performed by one or more other components of other suitable devices or systems. Further for explanatory purposes, some of the blocks of the process 1400 are described herein as occurring in serial, or linearly. However, multiple blocks of the process 1400 may occur in parallel. In addition, the blocks of the process 1400 need not be performed in the order shown and/or one or more blocks of the process 1400 need not be performed and/or can be replaced by other operations.

As illustrated in FIG. 14, at block 1402, a portable electronic device that includes a radar sensor may obtain a radar signal from a radar sensor (e.g., radar sensor 116). For example, the portable electronic device may be a handheld electronic device (e.g., a smartphone or a tablet) or a wearable electronic device (e.g., a smart watch or smart glasses). Obtaining the radar signals may include emitting, with the radar sensor, radar signals, and receiving reflected portions of the emitted signals. The reflected portions may be reflected from one or more objects in the physical environment of the electronic device.

At block 1404, the portable electronic device (e.g., TOI identifier 504 and/or object tracker 604) may identify a target of interest in an environment of the portable electronic device using the radar signal. For example, in one or more implementations, the portable electronic device may include another sensor (e.g., an inertial sensor, such as inertial sensor(s) 113), and the portable electronic device may identify the target of interest using the radar signal and sensor data from the other sensor of the portable electronic device.

At block 1406, the portable electronic device (e.g., feature extractor 508 and/or beam former 606) may extract a surface feature (e.g., one or more extracted surface features in the object feature data 510), for the target of interest, from the radar signals. The surface feature may be a time-varying surface feature. For example, the surface feature may include at least one of a radar cross-section (RCS), a micro-doppler feature, or a range. The surface feature may also, or alternatively, include an angle such as an azimuth angle and/or an elevation angle.

At block 1408, the portable electronic device (e.g., classifier 512 and/or machine learning model 514) may obtain a classification of an object corresponding to the target of interest using the extracted surface feature. In one or more implementations, the portable electronic device may obtain the classification using time-varying surface features. As examples, the electronic device may extract and use a time-varying micro-doppler feature, a time-varying range, a time-varying RCS, a time-varying power-range profile, a range-angle profile, and/or a time-varying power-angle profile (e.g., a time-varying power-azimuth profile, a time-varying power-elevation profile, a time-varying power-range-azimuth profile and/or a time-varying power-range-azimuth-elevation profile) for the classification. For example, in one exemplary use case, a human at long range approaching the electronic device may have a motion characteristic of a single point target in a range-azimuth point cloud. In this exemplary use case, as the human approaches the electronic device, the range-azimuth point cloud may spread to multiple spatial detections (e.g., highlighting human characteristic features of the human that differ from the characteristics of a point target).

In another exemplary use case, an approaching wall or pole (e.g., or another stationary object that does not have separately moving parts) may exhibit less azimuth spread in a range-azimuth point cloud, than an approaching human. Thus, a range-azimuth profile, such as a time-varying range-azimuth profile, can, in one or more use cases, further augment other time-varying features, such as a time-varying RCS and/or a time-varying micro-doppler feature or a cadence, to enable more effective classification of objects.

In one or more implementations, the portable electronic device may also include a memory (e.g., memory(ies) 107) storing a machine learning model (e.g., machine learning model 514) trained to classify objects based on time-varying radar cross-sections (see, e.g., FIG. 7). The extracted surface feature may include a radar cross-section, and the portable electronic device may obtain the classification of the object corresponding to the target of interest using the extracted surface feature by providing a time variation of the radar cross-section (e.g., multiple RCS measurements obtained over time) to the machine learning model, and obtaining a resulting output from the machine learning model. In one or more implementations, additional time-varying information (e.g., a time-varying power-range profile, a time-varying power-angle profile, and/or a time-varying micro-doppler feature) may be provided, as input(s), to the machine learning model.

At block 1410, the electronic device may determine, based at least in part on the classification of the object, whether to generate an alert. For example, the electronic device may determine that the object is a stationary object or a moving object (e.g., and/or whether the object is an visible opaque object or a transparent object such as a window or a glass wall or door) and determine whether to generate the alert by determining a velocity of the device relative to the object, and a time-to-impact between the device and the object based on the velocity. In one or more implementations, if the velocity and/or the time-to-impact satisfy a threshold, the electronic device may determine that the alert is to be generated, and generate the alert. As discussed herein, an alert generated by the electronic device may include an auditory alert, a tactile alert, and/or a visual alert.

Figure 15:
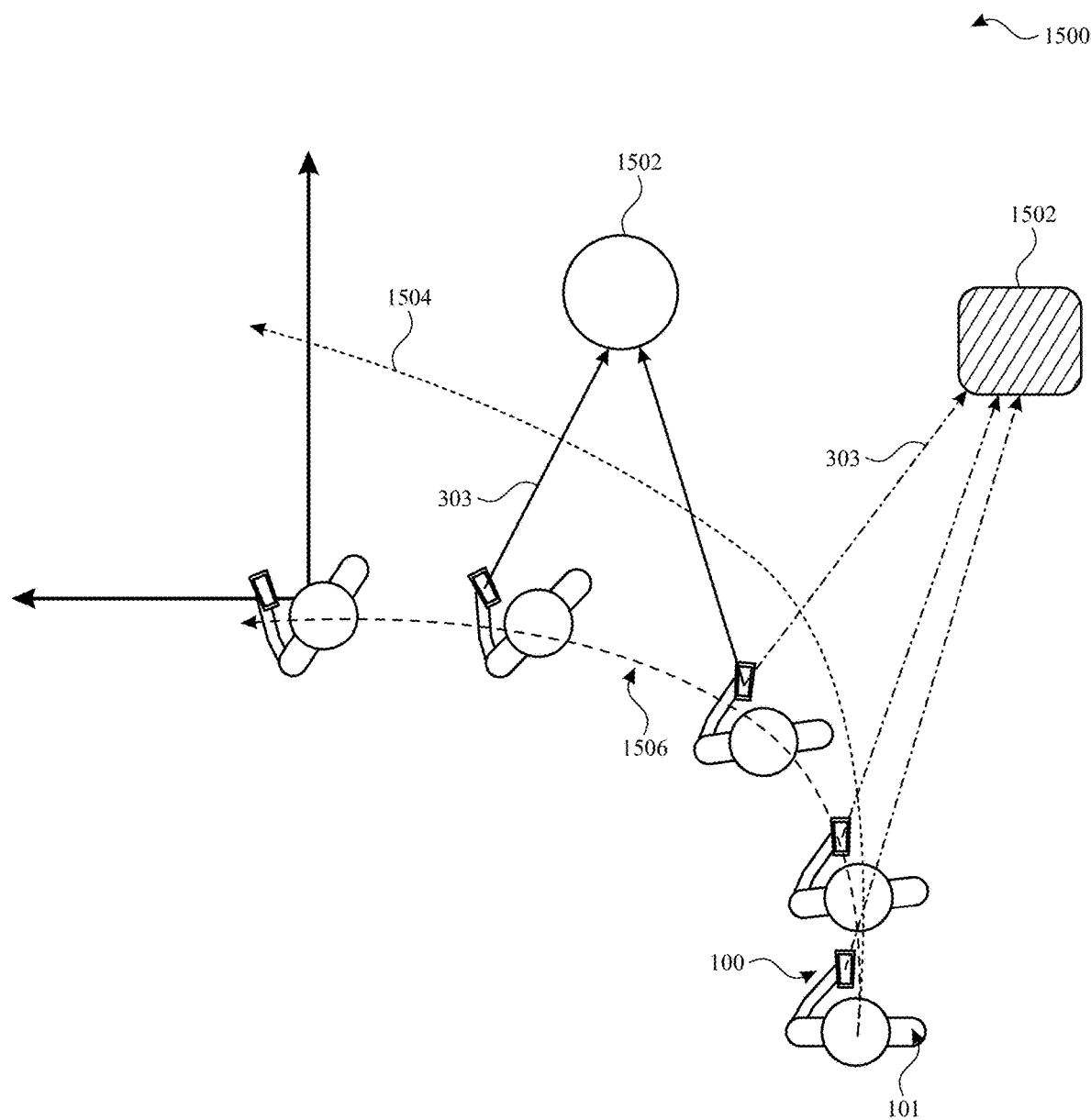
FIG. 15 illustrates an example improvement to a dead reckoning operation based on object detection, tracking, and/or classification using radar data in accordance with implementations of the subject technology.

The object information (e.g., classification information, such as an object type, and/or surface features or other object information) generated by the operations of any of FIG. 12, 13, or 14 can be used in various applications. For example, FIG. 15 illustrates a use case in which radar data is used for acceleration-gyro drift mitigation in a dead-reckoning tracking operation. In the example of FIG. 15, a user 101 is depicted carrying or wearing an electronic device 100 that is equipped with inertial sensors (e.g., inertial sensors 506 of FIG. 5 and/or inertial sensor(s) 113 of FIG. 2) and one or more wireless sensing transceivers (e.g. a radar sensor 116, such as a 60 GHz radar transceiver) through a physical environment 1500. In this example, the physical environment 1500 includes two stationary objects 1502.

The inertial sensor (e.g., one or more gyroscopes, one or more accelerometers, and/or one or more magnetometers) may be used to provide estimates of speed and bearing for dead-reckoning tracking of the electronic device 100. However, in some use cases, due to drift in these inertial sensors, bias errors can accumulate, thus impacting the accuracy of estimated track of the electronic device over time. For example, FIG. 15 illustrates an estimate track 1504 of the electronic device that is increasingly inaccurate due to inertial sensor drift.

In one or more implementations, aspects of the subject technology can be used to mitigate the effect of these inertial sensor drifts by, for example, detecting, classifying and learning the location and stationary status of one or more stationary objects in the environment, and then using the stationary objects as reference markers to mitigate the drift in bearing and acceleration.

For example, stationary objects 1502 may be or include fixed obstacles such as walls, concrete column beams, cabinets, etc., and can be used as reference points once a location for each object has been determined and once the objects have been classified as stationary objects. As discussed herein, radar-detected features such as micro-doppler features extracted from radar signals 303, can be used to determine that the stationary objects 1502 are stationary, and then range and/or angle measurements to the identified markers formed by the stationary objects 1502 can be used to reset bearing drifts.

In one or more implementations, a micro-doppler signature from fixed markers formed by the stationary objects 1502 can be used to estimate a cadence and a ground speed. In one or more implementations, a stride length of the strides of the user walking through the environment 1500 carrying and/or wearing the electronic device 100 can then be estimated directly using the radar data, which can also be applied to the inertial data tracking to help mitigate effect of the inertial sensor drift (e.g., accelerometer drift). In the example of FIG. 15, a corrected track 1506, generated by applying the range and/or angle measurements to the stationary objects 1502, the cadence and/or ground speed of the user, and/or the stride length, to the drifting track 1504, is shown that more closely tracks the actual movements of the user 101.

In the example of FIG. 15, the radar returns from stationary object 1502 may be tracked and classified, surface features, such as micro-doppler may be extracted, and the speed, cadence, and/or relative angle of the electronic device 100 to the stationary objects 1502 may be used to mitigate biases in inertial sensors.

In one or more implementations, object information and/or user information derived from the radar data obtained using the radar sensor 116 can also be applied in other use cases. These other use cases include, as non-limiting examples, using the user's directly measured stride length to measure a distance traveled while walking and/or running, a number of calories burned during walk or a run, a number of steps taken during a period of time, or other measurements and/or estimates of health-related data for the user.

In accordance with one or more implementations, the subject technology provides for use of wireless signal features obtained from a wireless transceiver to classify targets/objects. In accordance with one or more implementations, time-varying signatures in radar data may be used to classify target objects. For example, as a transceiver approaches an object, multiple reflected signals may be captured, and time variations of the captured reflected signals due to multipath fluctuations can reveal the underlying physical structure of the object. For example, a time-varying radar cross section (RCS) may be used as a feature for the classification of the detected target/object. In this example, as the transceiver approaches a target, the estimated RCS may vary in an object-specific manner due to constructive/destructive combinations of the multipath reflections from the target.

In accordance with one or more implementations, an electronic device having a radar sensor may also include an inertial sensor to improve the detection and classification of targets of interest. For example, in an implementation in which an electronic device has a radar sensor and an inertial sensor, the inertial sensor may be used to identify whether the user's head is facing a wall or looking downward, which may be used to identify objects that reflect the radar signals from the electronic device. Integration of this information with the extracted wireless (radar) features can provide a more accurate object detection and classification.

In one or more implementations, an electronic device may be provided with a machine learning module for classification of targets, which can improve the user experience for a given application. In one or more implementations, an electronic device may provide the relative speed between one or more objects and the user/transceiver. The relative speed can be used to provide a time-to-impact alert. The ability to use radar sensors to provide a time-to-impact alert can provide an improvement over IR-based cameras, particularly in the cases in which the approaching object is or includes highly transparent and/or reflective surfaces. Further, unlike IR-based techniques, an electronic device having a radar sensor for object detection and/or classification can provide object detection, classification, and/or other features such as time-to-impact alerts in the absence of ambient light.

In one or more implementations, radar reflections from a reference surface can also be used to determine whether approaching obstacles are moving or fixed. For example, in an example in which a person is walking with a smartphone that includes a radar sensor, the micro-doppler of radar reflections coming from the ground directly beneath the smartphone can be provide a "self" micro-doppler view which can be compared with the micro-doppler of incoming targets. Higher correlation of micro-doppler signature of objects with the micro-doppler of the ground may indicate a fixed target.

In one or more implementations, integration of indoor object detection and classification using radar signals can provide estimates of stride length. For example, the extracted micro-doppler signature from detected/classified reference objects may be used to estimate a cadence in addition to a velocity.

In one or more implementations, the subject technology provides systems, devices, methods and techniques to process wireless signal reflections from objects in an environment to extract features that classify the detected objects. Accurate classification using these wireless signal reflections enables a myriad of wireless sensing applications. In one example, a vision impaired person can use a smartphone equipped with wireless sensing system (e.g. a mmWave radar) to navigate an indoor environment. In one or more implementations, the subject technology can assist a vision impaired person to navigate indoor environments by providing an indication and warning of proximity and type of objects (e.g. wall, human, pole) in the path of the user. A warning or alert to the user of a proximal object or an imminent impact can be provided using haptic and/or auditory feedback in one or more implementations. Additionally or alternatively, an alert can be graphically presented, e.g., as an image or notification. In still other implementations, an alert can be signaled by pausing or stopping audio and/or visual output.

As discussed herein, some implementations of IR depth sensing technology based on IR-sensors can have problems in detecting transparent, highly reflective and/or uniform surfaces such as glass doors, windows, mirrors and uniformly colored walls. In one or more implementations, the subject technology can augment IR depth sensors in detecting these surfaces, estimating the range to the surfaces from the sensor, and classifying the type of the surface.

In one or more implementations, the subject technology can be used in generating maps of a physical environment of an electronic device. Maps generated using radar sensors to detect, locate, classify, and/or track objects in the environment can be provided for use in augmented reality and/or virtual reality applications. The mapping of the environment using an electronic device having a radar sensor can provide an accurate range to objects. In addition, the type of object can be classified to assist the accuracy/efficacy of the mapping.

Various processes defined herein consider the option of obtaining and utilizing a user's personal information. For example, such personal information may be utilized in order to provide object tracking and/or classification. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

In accordance with aspects of the subject disclosure, a method is provided that includes obtaining radar signals from a radar sensor of an electronic device; identifying a motion characteristic corresponding to the electronic device based on the radar signals; detecting an object in an environment of the electronic device using the radar signals; and classifying the object using the radar signals and the identified motion characteristic; and determining, by the electronic device, whether to generate an alert based on the detecting and classifying of the object.

In accordance with aspects of the subject disclosure, a method is provided that includes obtaining radar signals from a radar sensor of an electronic device; extracting a radar cross-section and a micro-doppler signal from the radar signals; classifying an object in an environment of the electronic device based on the radar cross-section and the micro-doppler signal; and determining, by the electronic device and based at least in part on the classification of the object, whether to generate an alert.

In accordance with aspects of the subject disclosure, a portable electronic device is provided that includes a radar sensor and one or more processors configured to: obtain a radar signal from the radar sensor; identify a target of interest in an environment of the portable electronic device using the radar signal; extract a time-varying surface feature, for the target of interest, from the radar signals; obtain a classification of an object corresponding to the target of interest using the extracted time-varying surface feature; and determine whether to generate an alert based at least in part on the classification of the object.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neutral gender (e.g., her and its) and vice versa. Headings and subheadings, if any, are used for convenience only and do not limit the subject disclosure.

What is claimed is:

1. A method, comprising:
   obtaining, during a motion of an electronic device, one or more radar signals from a radar sensor of the electronic device;
   identifying a motion characteristic corresponding to a user carrying or wearing the electronic device and based on a related motion of the electronic device, the motion characteristic corresponding to the electronic device based at least in part on the one or more radar signals;
   detecting an object in an environment of the electronic device based at least in part on the one or more radar signals;
   classifying the object based at least in part on the one or more radar signals and the identified motion characteristic, wherein the object comprises a stationary object, and wherein classifying the object comprises:
      identifying, using the one or more radar signals, a second cadence corresponding to the object, and
      determining that the second cadence substantially matches a first cadence corresponding to the motion characteristic related to the electronic device; and
   determining, by the electronic device, whether to generate an alert based on the detecting and classifying of the object.

2. The method of claim 1, wherein the motion characteristic comprises a characteristic of walking motion.

3. The method of claim 2, wherein the motion characteristic further comprises a characteristic of at least one of a leg swing motion or an arm swing motion.

4. The method of claim 2, wherein classifying the object comprises classifying the object as a moving object or a stationary object, and wherein identifying the motion characteristic comprises identifying, using the one or more radar signals, the first cadence corresponding to the walking motion.

5. The method of claim 4, further comprising:
   classifying a second object, wherein the second object comprises a moving object, and wherein classifying the second object comprises:
   identifying, using the one or more radar signals, a third cadence corresponding to the second object; and
   determining that the third cadence is different from the first cadence; and
   wherein identifying the first cadence using the one or more radar signals comprises identifying the first cadence using a first portion of the one or more radar signals corresponding to a reflection from a ground surface, and wherein identifying the third cadence using the one or more radar signals comprises identifying the third cadence using a second portion of the one or more radar signals corresponding to a reflection from the second object.

6. The method of claim 4, further comprising:
   determining a stride length of a device user based in part on the first cadence; and
   generating health data for the device user based on the stride length.

7. The method of claim 1, wherein identifying the first cadence using the one or more radar signals comprises identifying the first cadence using a first portion of the one or more radar signals corresponding to a reflection from a ground surface, and wherein identifying the second cadence using the one or more radar signals comprises identifying the second cadence using a second portion of the one or more radar signals corresponding to a reflection from the object, the object being different from the ground surface.

8. The method of claim 1, further comprising:
   tracking motion of the electronic device using a sensor of the electronic device other than the radar sensor;
   determining a location of the stationary object using the one or more radar signals; and
   modifying the tracking of the motion of the electronic device based on the location of the stationary object.

9. The method of claim 1, wherein the stationary object comprises a pane of glass, wherein classifying the object further comprises classifying the object as glass, and, wherein identifying the motion characteristic further comprises determining a velocity of the electronic device relative to the pane of glass.

10. The method of claim 9, wherein determining whether to generate the alert comprises estimating a time-to-impact between the electronic device and the pane of glass based on the velocity.

11. The method of claim 10, wherein determining whether to generate the alert comprises determining that the time-to-impact satisfies a threshold for generating the alert, the method further comprising generating the alert with the electronic device.

12. A method, comprising:
    obtaining radar signals from a radar sensor of a wearable electronic device in oscillatory motion;
    extracting a radar cross-section and a micro-doppler signal from the radar signals;
    classifying an object in an environment of the wearable electronic device based on the radar cross-section and the micro-doppler signal, wherein classifying the object comprises classifying the object based on a time variation of the radar cross-section by providing at least the time variation of the radar cross-section to an engine at the wearable electronic device; and
    determining, by the wearable electronic device and based at least in part on the classification of the object, whether to generate an alert.

13. The method of claim 12, further comprising determining a velocity of the wearable electronic device relative to the object, and a time-to-impact between the wearable electronic device and the object based on the velocity, and wherein the alert corresponds to a collision alert.

14. The method of claim 12, wherein classifying the object further comprises distinguishing between an opaque planar surface and a transparent planar surface.

15. The method of claim 12, further comprising, prior to classifying the object:
    performing an initial target detection using the one or more radar signals;
    determining a location of a potential target object based on the initial target detection; and
    extracting the radar cross-section, the micro-doppler signal, a range, and an angle, from the one or more radar signals based on the location, in part, by performing a beam forming operation on the one or more radar signals using the location.

16. The method of claim 12, further comprising mitigating drift in an inertial sensor of the wearable electronic device based on the obtained radar signals.

17. A portable electronic device, comprising:
a radar sensor; and
one or more processors configured to:
  obtain radar signals from the radar sensor;
  identify a stationary target of interest in an environment of the portable electronic device using the radar signals;
  extract a time-varying surface feature for the stationary target of interest based on motion of the radar sensor detected across radar signals;
  obtain a classification of an object corresponding to the stationary target of interest using the extracted time-varying surface feature by providing a time variation of a radar cross-section to a machine learning model stored on the portable electronic device and trained to classify objects based on time-varying radar cross-sections, and obtaining a resulting output from the machine learning model; and
  determine whether to generate an alert based at least in part on the classification of the object.

18. The portable electronic device of claim 17, further comprising an inertial sensor, wherein the one or more processors are configured to identify the stationary target of interest using the one or more radar signals and sensor data from the inertial sensor of the portable electronic device.

19. The portable electronic device of claim 18, wherein the obtained radar signals correspond to multiple flat surfaces of the stationary target of interest, wherein the obtained radar signals comprise constructive or destructive interference generated by the multiple flat surfaces, wherein the extracted time-varying surface feature comprises at least one of a time-varying radar cross-section, a time-varying micro-doppler feature, a time-varying power-range profile, or a time-varying power-angle profile, wherein the time-varying power-angle profile may include a time-varying power with respect to at least one of an azimuth or an elevation.

20. The portable electronic device of claim 17, wherein the obtained radar signals correspond to multiple flat surfaces of the stationary target of interest.

* * * * *